(12) United States Patent
Laflamme

(10) Patent No.: US 7,473,062 B2
(45) Date of Patent: Jan. 6, 2009

(54) CARGO RESTRAINT SYSTEM

(75) Inventor: Michel Laflamme, Granby (CA)

(73) Assignee: Cresswell Industries Inc., Granby, Quebec (CA)

( * ) Notice: Subject to any disclaimer, the term of this patent is extended or adjusted under 35 U.S.C. 154(b) by 442 days.

(21) Appl. No.: 11/345,297

(22) Filed: Feb. 2, 2006

(65) Prior Publication Data

US 2007/0177956 A1    Aug. 2, 2007

(51) Int. Cl.
*B61D 45/00*    (2006.01)
(52) U.S. Cl. ...................................................... 410/108
(58) Field of Classification Search ................ 410/101, 410/106, 108, 110, 115
See application file for complete search history.

(56) References Cited

U.S. PATENT DOCUMENTS

| | | | | |
|---|---|---|---|---|
| 3,351,356 | A | * | 11/1967 | Clark et al. .................. 410/110 |
| 3,715,993 | A |   | 2/1973  | Orlik |
| 3,972,500 | A |   | 8/1976  | Johnson et al. |
| 4,219,229 | A |   | 8/1980  | Ciocan |
| 4,531,774 | A | * | 7/1985  | Whatley ..................... 296/37.6 |
| 4,955,771 | A |   | 9/1990  | Bott |
| 5,310,297 | A |   | 5/1994  | Benjamin |
| 5,509,715 | A | * | 4/1996  | Scharpf ....................... 52/408 |
| 5,674,033 | A | * | 10/1997 | Ruegg ........................ 410/104 |
| 5,733,082 | A | * | 3/1998  | Schrader .................... 410/115 |
| 5,788,437 | A | * | 8/1998  | Kalis, Jr. .................... 410/107 |
| 6,139,235 | A | * | 10/2000 | Vander Koy et al. ........ 410/111 |
| 6,578,889 | B2 | * | 6/2003  | Pearl .......................... 294/1.1 |
| 6,585,465 | B1 | * | 7/2003  | Hammond et al. .......... 410/104 |
| 6,585,466 | B2 | * | 7/2003  | Zhan et al. .................. 410/116 |
| 6,612,631 | B1 | * | 9/2003  | Pearl .......................... 294/1.1 |
| 6,666,635 | B2 |   | 12/2003 | Holt et al. |
| 6,709,209 | B2 | * | 3/2004  | Zhan et al. .................. 410/104 |
| 6,918,721 | B2 | * | 7/2005  | Venton-Walters et al. ... 410/102 |

OTHER PUBLICATIONS

Commercial brochure printed in Canada in Oct. 1991 for the company Cresswell.

* cited by examiner

*Primary Examiner*—H Gutman
(74) *Attorney, Agent, or Firm*—Francois Martineau

(57) ABSTRACT

A cargo restraint system is provided, comprising a floor structure defining a number of anchorage openings made thereon with each anchorage opening defining a maximum width. The cargo restraint system also comprises at least one elbowed fastener having an elongated head portion defining a length greater than the anchorage opening maximum width and a maximal cross-sectional width smaller than the anchorage opening maximum width, the elbowed fastener also defining a body portion connected transversely to the head portion; wherein the head portion of the elbowed fastener can be inserted into one of the anchorage openings of the floor structure and the body portion can extend from this anchorage opening and project away from the floor structure. Moreover, at least one cargo restraint member is provided in the cargo restraint system, for restraining movement of a cargo item about the floor structure. In use, the elbowed fastener head portion can releasably engage one of the anchorage openings, and the elbowed fastener body portion can lockingly engage the cargo restraint member, so as to fasten the latter to the floor structure.

16 Claims, 7 Drawing Sheets

CARGO RESTRAINT SYSTEM

FIELD OF THE INVENTION

The present invention relates to cargo restraint systems, and more particularly to a cargo restraint system using elbowed fasteners to fasten cargo restraint members to the floor of a cargo container.

BACKGROUND OF THE INVENTION

It is known to use cargo restraint systems to secure cargo to the floor of a cargo container during transportation thereof.

Prior forms of cargo restraint systems are very diverse, and include various types of cargo restraint members such as metallic buckles permanently affixed to the floor of the cargo container, through which straps can be passed so as to enable strapping of the cargo units to the cargo container floor. Other cargo restraint means include a number of chocks or elongated rails releasably affixed to the flooring of the cargo container, and positioned in pressing engagement against cargo items so as to prevent them from accidentally moving horizontally and freely on the container's flooring.

Moreover, a number of means are used to secure these cargo restraint members to the container's flooring, but are generally either too complicated to set up or not effective in securing the cargo restraint members to the flooring in a reliable fashion. Improperly restrained cargo can become a hazard to workers in the vicinity, and can bring about important structural damage to the cargo and to nearby upright wall structures.

SUMMARY OF THE INVENTION

The present invention relates to a cargo restraint system, comprising:
 a floor structure defining a number of anchorage openings made thereon, each said anchorage opening defining a maximum width;
 at least one elbowed fastener having an elongated head portion defining a length greater than said anchorage opening maximum width and a maximal cross-sectional width smaller than said anchorage opening maximum width, said elbowed fastener also defining a body portion connected transversely to said head portion; wherein said head portion of said elbowed fastener is inserted into one of said anchorage openings of said floor structure and said body portion can extend from this said anchorage opening and project away from said floor structure;
 at least one cargo restraint member for restraining movement of a cargo item about said floor structure;
wherein said elbowed fastener head portion can releasably engage one of said anchorage openings, and said elbowed fastener body portion can lockingly engage said cargo restraint member, so as to fasten the latter to said floor structure.

In one embodiment, said elbowed fastener comprises an L-shaped bolt defining a bolt threaded shank portion and a bolt elongated head portion connected transversely thereto and corresponding to said elbowed fastener head portion, said elbowed fastener further comprising a nut capable of threadingly engaging said bolt threaded shank portion, said bolt threaded shank portion and said nut in combination forming said elbowed fastener body portion.

In one embodiment, said cargo restraint member comprises at least one opening for penetration by said bolt threaded shank portion, and said nut can be screwed onto said threaded shank portion in order for a bottom portion of said nut to be applied against said cargo restraint member for fastening the latter to said floor structure.

In one embodiment, said nut bottom portion defines a ribbed surface for enabling increased biting action thereof onto said cargo restraint member.

In one embodiment, said floor structure defines a top wall across which said anchorage openings are made, with bolt abutment means attached to an undersurface of said top wall in the vicinity of said anchorage openings, said bolt abutment means for allowing said bolt head portion to abut against said bolt abutment means when said nut is screwed onto said bolt threaded shank portion.

In one embodiment, the cargo restraint system further comprises at least one elongated beam affixed to said floor structure undersurface, said elongated beam comprising two side walls transverse to said floor structure undersurface and a bottom wall extending transversely to and between said side walls, said side walls forming said bolt abutment means.

In one embodiment, said cargo restraint member is an elongated rail, and said cargo restraint system comprises at least two elbowed fasteners.

In one embodiment, said elongated rail is cross-sectionally C-shaped, and comprises two elongated side walls each connected at one edge to opposite longitudinal edges of an elongated bottom wall, with openings being made through said rail bottom wall each made for selective engagement by said body portion of a corresponding one of said elbowed fasteners, said side walls carrying at another edge an open top rail surface.

In one embodiment, the length of said body portion of each of said elbowed fasteners is such that it clears said open top rail surface when it fastens said rail to said floor structure.

In one embodiment, said elongated rail comprises a number of rail openings made on said rail bottom wall, each for penetration by said body portion of one of said elbowed fasteners.

In one embodiment, said rail openings are ellipsoid slots, each said ellipsoid slot extending in a direction transverse to said longitudinal rail, for enabling fine-tune displacement of said rail along said transverse direction when at least one of said ellipsoid slots is penetrated by said body portion of one of said elbowed fasteners.

In one embodiment, said anchorage openings are circular.

In one embodiment, said floor structure comprises a number of elongated tongue-and-groove type slats fitted close to one another.

The present invention also relates to a cargo restraint system, comprising:
 a floor structure defining a number of anchorage openings made thereon, each said anchorage opening defining a maximum width;
 at least one elbowed fastener, for attaching a cargo restraint member to said floor structure, said elbowed fastener having an elongated head portion defining a length greater than said anchorage opening maximum width and a maximal cross-sectional width smaller than said anchorage opening maximum width, said elbowed fastener also defining a body portion connected transversely to said head portion; wherein said head portion of said elbowed fastener is inserted into one of said anchorage openings of said floor structure and said body portion can extend from this said anchorage opening and project away from said floor structure;

wherein said elbowed fastener head portion can releasably engage one of said anchorage openings, and said elbowed fastener body portion is for lockingly engaging the cargo restraint member to fasten the latter to said floor structure.

The present invention also relates to a cargo restraint system, for use with a floor structure defining a top wall and a number of anchorage openings made through the top wall, each anchorage opening defining a maximum width; said cargo restraint system comprising:

bolt abutment means, to be provided about an undersurface of the floor structure top wall in the vicinity of its anchorage openings;

at least two elbowed bolts having an elongated head portion defining a length such as to be greater than the anchorage opening maximum width, and defining a maximal cross-sectional width such as to be smaller than the anchorage opening maximum width, said elbowed bolt also defining a threaded shank portion connected transversely to said head portion; wherein said bolt head portion can be inserted into one of the anchorage openings of the floor structure and said threaded shank portion can extend from this anchorage opening and project away from the floor structure top wall;

a nut capable of threadingly engaging said bolt threaded shank portion;

wherein said bolt head portion can be inserted in one of the anchorage openings and said nut is screwed on said bolt threaded shank portion for fastening a cargo restraint member to the floor structure; and wherein said bolt head portion abuts against said bolt abutment means when said nut is screwed onto said threaded shank portion to prevent rotational movement of said bolt.

DESCRIPTION OF THE DRAWINGS

In the annexed drawings:

FIG. 4b is a cross-section of the elbowed fastener taken along lines 4b-4b of FIG. 4a.

DETAILED DESCRIPTION OF THE EMBODIMENTS

Figure 1:
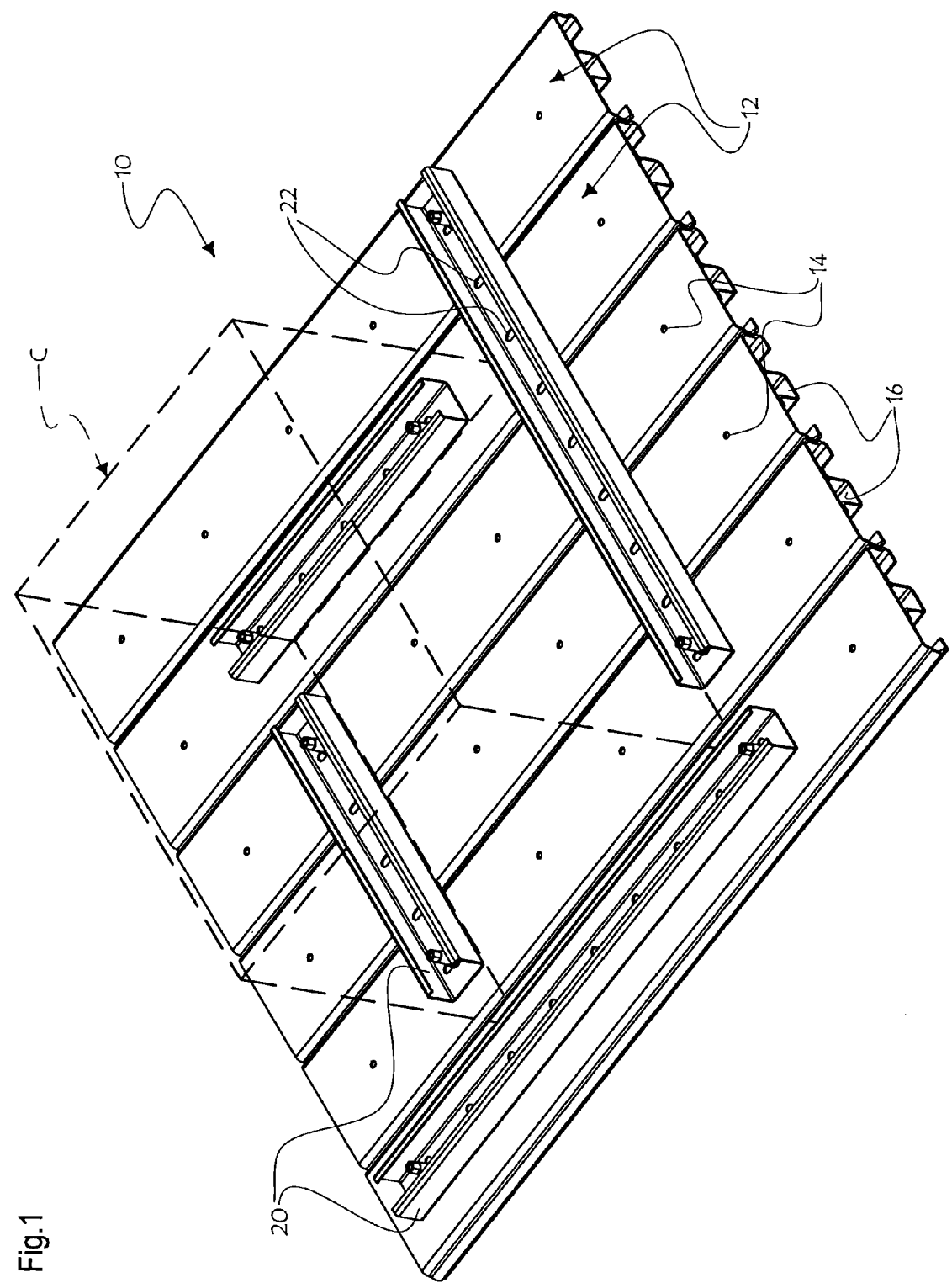
FIG. 1 is a top perspective view of the cargo restraint system of the present invention.

FIG. 1 shows a cargo restraint system 10 according to the present invention, for use for example on, the flooring of cargo containers of transporters such as freighters or merchandise trains.

Cargo restraint system 10 comprises a number of elongated flooring slats 12, made of formed metal for example, for installation on the floor of a cargo container. Each flooring slat 12, as best illustrated in FIGS. 2a-2d, are of the tongue-and-groove type, and comprise a top load-bearing flat wall 12a, a lateral tongue portion 12b depending downwardly from one of the two longitudinal edges of top wall 12a, a lateral groove portion 12c depending downwardly from the longitudinal edge of top wall 12a opposite tongue portion 12b, and a pair of floor-bearing bottom flanges 12d, 12d' each projecting integrally inwardly from the bottom edge of tongue and groove portions 12b and 12c respectively in generally parallel fashion to slat top wall 12a. When slats 12 are installed in a cargo container, their bottom floor-bearing flanges 12d, 12d' rest on the floor of the cargo container, and all slats 12 are juxtaposed and serially interlocked such that the tongue portion 12b of a given slat 12 snugly engages the groove portion of the adjacent slat 12. In this fashion, flanges 12d, 12d' maintain slat top wall 12a spacedly above the cargo container floor.

Moreover, each slat 12 comprises a number of anchorage openings 14 made across its top wall 12a and spaced apart along the length of elongated slat 12. In the illustrated embodiment of the invention, anchorage openings 14 are circular and are located centrally on slat top wall 12a, at equidistance from tongue and groove slat portions 12b and 12c respectively. An open elongated beam 16 extends longitudinally along the underside of each slat's load-bearing top wall 12a. Beam 16 as shown in the figures is cross-sectionally U-shaped, but may be V- or W-shaped, or may have any other suitable shape. Beam 16 comprises a pair of parallel, planar side walls 16a, 16a' extending on opposite sides of the series of anchorage openings 14, a bottom wall 16b extending between the bottom edge of side walls 16a, 16a', and side tabs 16c, 16c' extending outwardly from the edge of side walls 16a, 16a' opposite bottom wall 16b and applied against the undersurface of load-bearing wall 12a. Attachment of U-shaped beam 16 to the underside of load-bearing wall 12a is accomplished for example by welding of the outer edge of both side tabs 16c, 16c' thereto.

Slats 12 are intended to support cargo items such as the schematically illustrated cargo item C in FIG. 1. In order to prevent accidental shifts of these cargo items C about slats 12 during movement of the transporter, cargo restraint system 10 is provided with a number of cargo restraint members such as elongated, cross-sectionally C-shaped rails 20. Rails 20 comprise a bottom wall 20a, along which are made a number of slots 22. In the illustrated embodiment of the invention, slots 22 are elongated and ellipsoid, and extend transversely to elongated rails 20. Parallel side walls 20b, 20b extend upwardly from the longitudinal edges of bottom wall 20a perpendicularly thereto, and a pair of narrow flanges 20c, 20c' extend from the outer edge of side walls 20b, 20b inwardly towards each other, and perpendicularly to side walls 20b, 20b. In the illustrated embodiment of the invention, flanges 20c, 20c' are coplanar and form in combination a top rail surface which can bear loads if necessary. This top rail surface is open—a gap is present between the inner free edges of flanges 20c, 20c'—for access to the inner channel of rail 20.

Figure 4B:
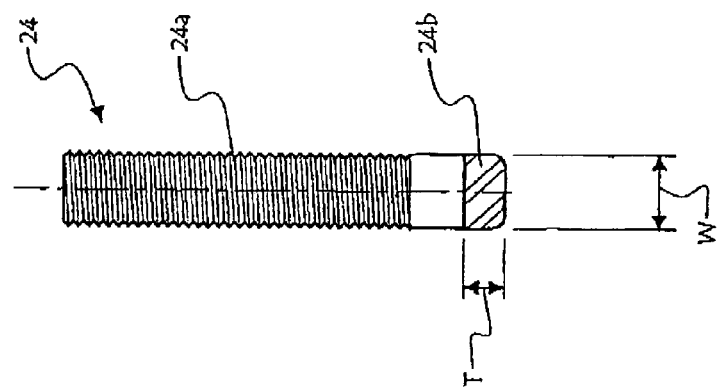
Figure 4A:
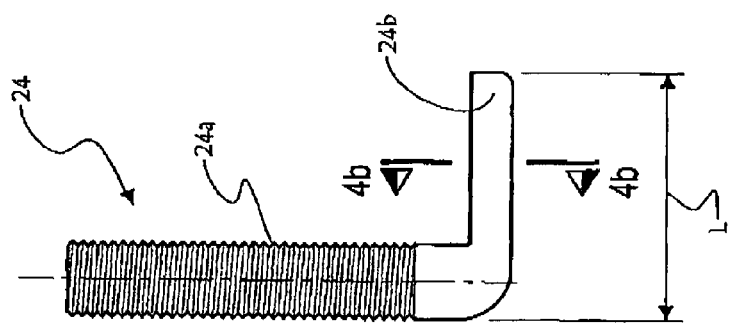
FIG. 4a is an enlarged side elevation of the L-shaped bolt of the elbowed fastener.

Rails 20 can be secured to slats 12 using elbowed fasteners as best shown in FIGS. 2a-4b. In the embodiment shown in the drawings, these elbowed fasteners comprise an elbowed or L-shaped bolt 24 defining a cylindrical shank portion 24a and a head portion 24b integrally and transversely connected thereto. Most of the shank portion's length is threaded, with the threads stopping short of the interconnection between shank portion 24a and head portion 24b. As best shown in FIGS. 4a and 4b, head portion 24b has a generally rectangular cross-section, and defines a length L, a thickness T and a width W. Head portion 24b has a tip portion 24b' (FIG. 2d) for abutting engagement with the inner wall of beam side walls 16a or 16a'.

Moreover, the elbowed fasteners also comprise a tubular elongated nut 30 having a main body portion 30a, and top hexagonal wrench grip portion 30b at one end of main body portion 30a, and a flared bottom end portion 30c at the opposite end of main body portion 30a. Also, the undersurface 30d of flared bottom portion 30e is preferably ribbed to provide increased biting action thereto, and a discoid indentation 30e is made in nut undersurface 30d. The cylindrical peripheral wall of the lumen of tubular nut 30 is partially threaded, at 30f, for threading cooperation with the threads of the bolt shank portion 24a.

Bolt head portion 24b is dimensioned such that its maximal cross-sectional width W (FIG. 4b) is smaller than the maximal width of the corresponding anchorage opening 14. Accordingly, in the embodiment of bolt 24 illustrated in the figures where head portion 24b is cross-sectionally rectangular, the width W and thickness T of the cross-sectionally rectangular bolt head portion 24 are each smaller than the diameter of the circular anchorage opening 14, thus permitting head portion 24b to be inserted through opening 14 and passed from the top to the bottom side of slat load-bearing top wall 12a. Moreover, the length L of the bolt head portion 24b is greater than the maximal width, i.e. the diameter, of anchorage openings 14.

Figure 2A:
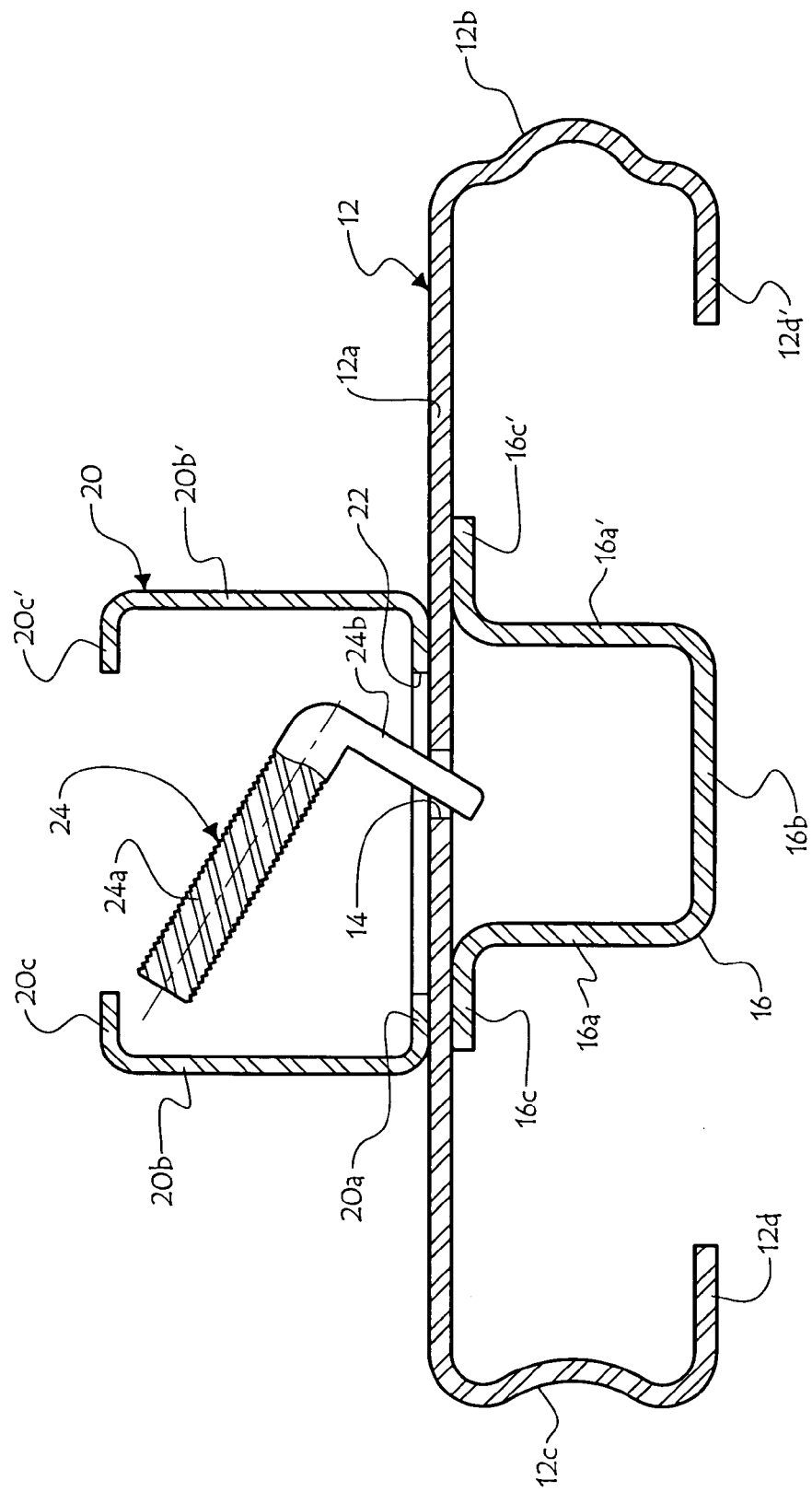
FIGS. 2a-2d are cross-sectional views at an enlarged scale of a slat from the cargo restraint system of FIG. 1, sequentially showing the anchoring of an elongated rail to the slat using an elbowed fastener.
Figure 2B:
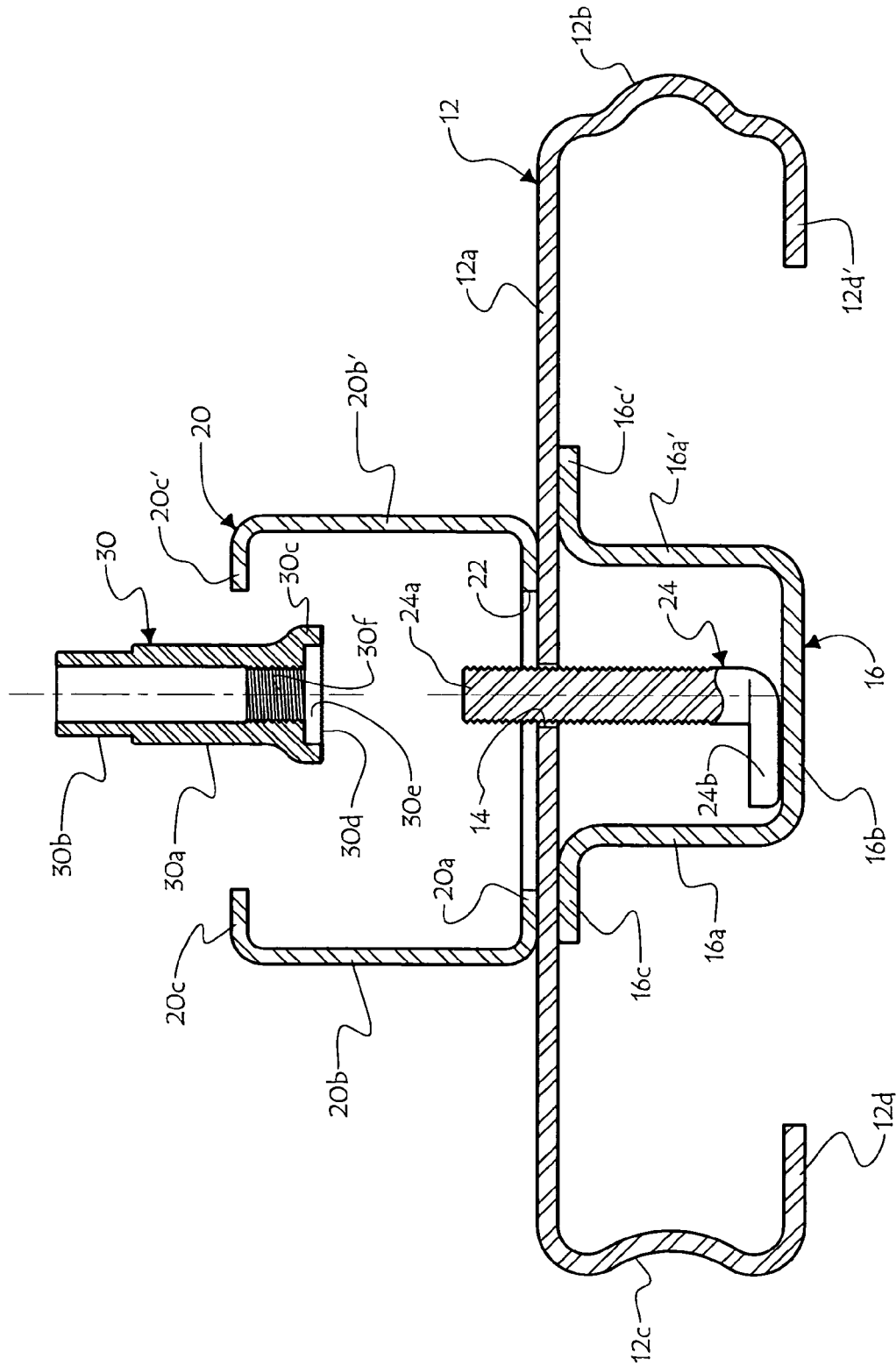
Figure 2C:
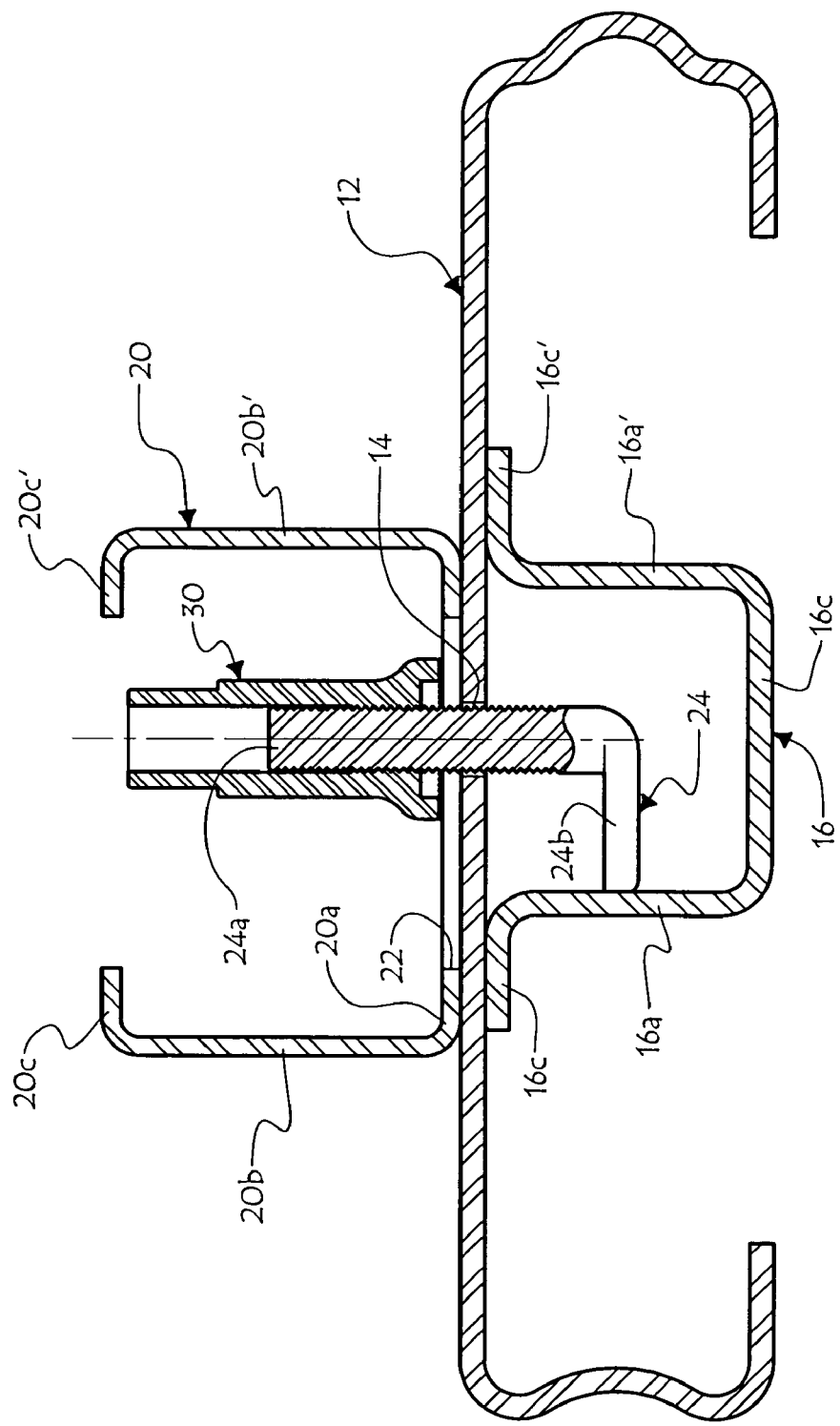

Free movement of item C about slats 12 can be restrained by rails 20 when the cargo container is in motion. Rails 20 can either be secured to the slats before or after a cargo item C has been positioned thereon. To secure a rail 10 to the flooring slats 12, the user first chooses a location and aligns a first ellipsoid slot 22 with a corresponding anchorage opening 14 on slat 12. Once this is accomplished, the elbowed bolt head portion 24b is inserted through the ellipsoid slot 22 and through the underlying anchorage opening 14 (FIG. 2a). Once head portion 24b is passed completely through both slot 22 and opening 14 (FIG. 2b) so as to be located on the underside of slat top wall 12a, elongated nut 30 can be screwed onto bolt threaded shank portion 24a which projects upwardly from the upper surface of slat top wall 12a, as shown in FIG. 2c, using a wrench to engage the wrench grip portion 30b of the nut for example. As the user rotates elongated nut 30, the outer end portion of bolt head portion 24b is brought to abut against one of the side walls 16a, 16a' of U-shaped beam 16 located on either side of anchorage opening 14. Elongated bolt 24b is therefore prevented from rotating as the user screws elongated nut 30 around the bolt's threaded shank portion 24a.

As the user screws nut 30 on bolt 24, the bolt head portion 24b gets progressively closer to and is eventually brought in pressing engagement against the undersurface of the slat's top wall 12a while remaining in abutment against one of beam side walls 16a, 16a'. Furthermore, ribbed undersurface 30d of elongated nut flared bottom portion 30c is brought in pressing engagement against the upper surface of C-shaped rail bottom wall 20a, so as to secure rail 20 to slat 12.

Before firmly tightening the elongated nut 30 against the rail bottom wall 30a, it is possible to fine-tune the position of elongated rail 20, by sliding rail 20 in the direction of the elongated ellipsoid slot 22 made across rail bottom wall 20a and engaged by the elbowed fastener composed of L-shaped bolt 24 and elongated nut 30. Once the rail is positioned as desired, the nut 30 can be firmly tightened against the rail bottom wall 20a (FIG. 2d), to locally anchor rail 20 to the slat 12 to which elbowed bolt 24 is hooked on to.

Figure 2D:
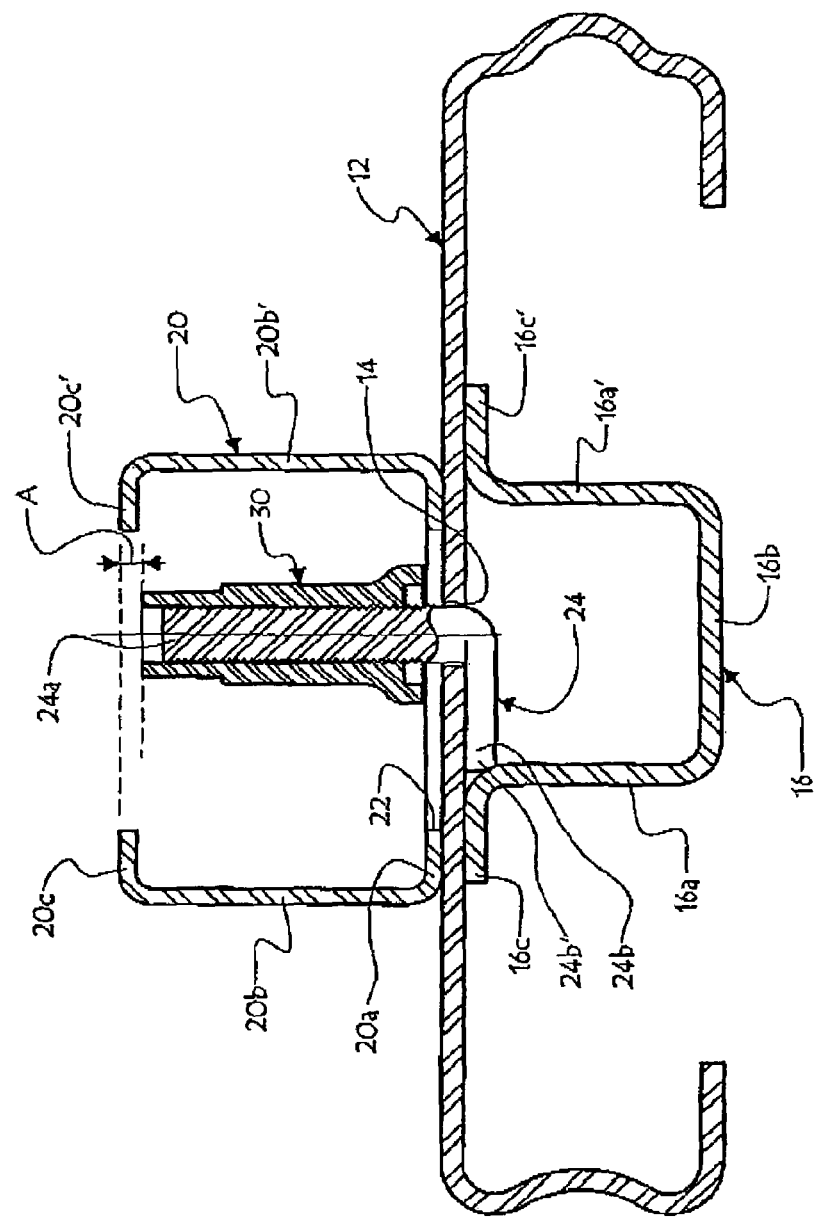
Figure 3:
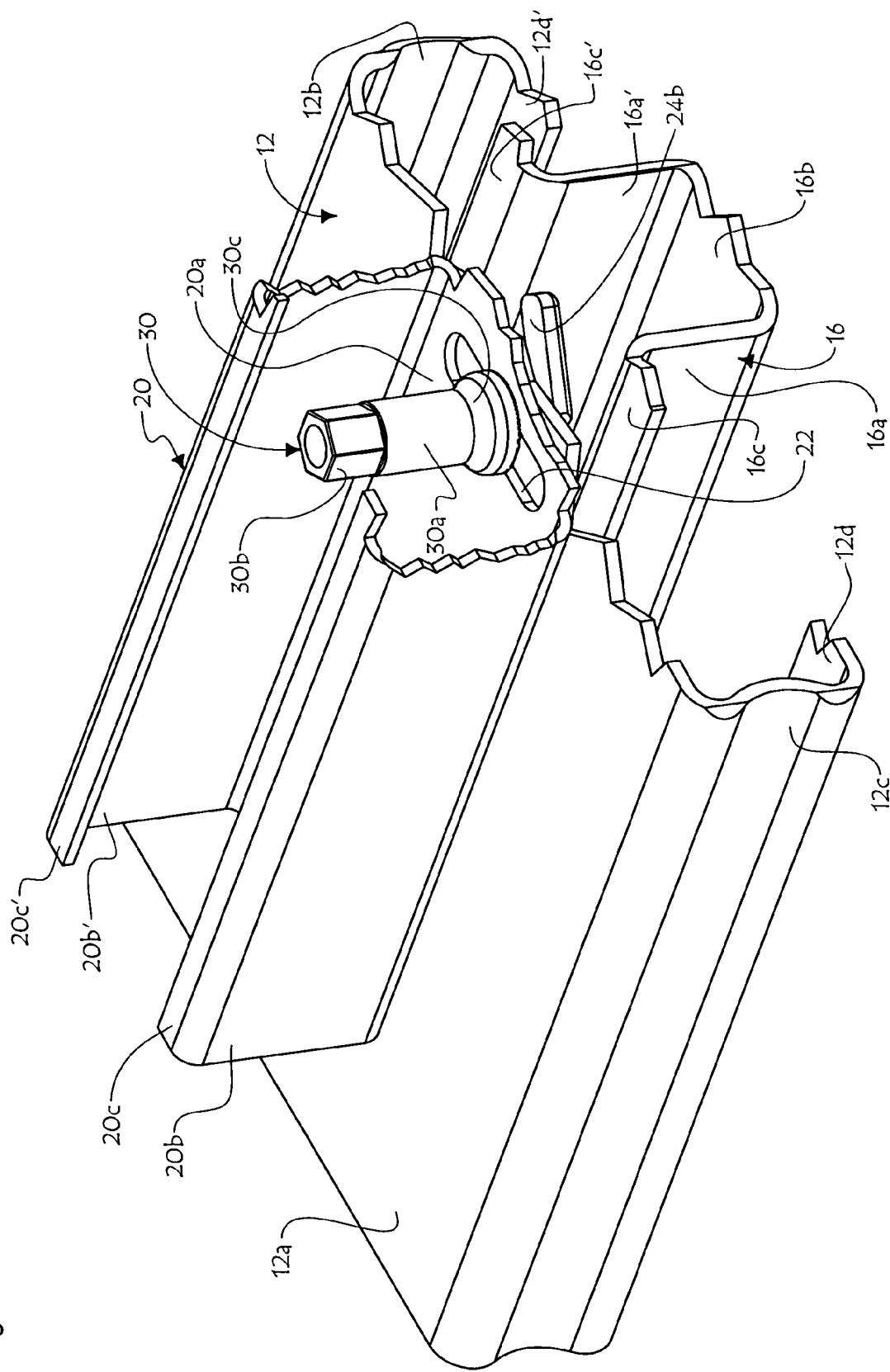
FIG. 3 is a perspective view of a slat, rail and elbowed fastener, with the slat and rail being partly broken for clarity of the view, showing the abutment of the head of the bolt of the elbowed fastener abutting on the side wall of U-shaped beam attached to the underside of the slat.

Once tightened, the upper free ends of elongated nut 30—i.e. wrench grip portion 30b—and of the threaded shank portion 24a both clear top surface of rail 20, as illustrated by arrow A in FIG. 2d. Accordingly, wide cargo loads can be placed on top of rail 20 without contacting nut 30, if necessary, so as to bear upon the top rail surface formed by the two flanges 20c, 20c'.

This fastening procedure is selectively repeated at spaced apart locations along the length of elongated rail 20, so as to wholly secure rail 20 to the underlying flooring slat structure.

It is noted that cargo restraint system 10 is highly modular, and that elongated rails 20 can be positioned either in parallel, perpendicular or oblique fashion relative to the elongated flooring slats 12.

This rail attachment procedure can be repeated to fasten a number of different rails to the flooring structure around a cargo item C laid thereon, as illustrated in FIG. 1. Once the cargo item is surrounded by fixed rails 20, it is constrained and free horizontal movement thereof about the flooring structure is prevented. It is understood that the four-sided rail arrangement shown in FIG. 1 is exemplary, and that rails 20 can be arranged to suit any shape of cargo.

An advantage of the present invention is that in the eventuality where the interconnection between nut 30 and bolt 24 accidentally comes loose, the elbowed fastener 24, 30 should nevertheless remain connected to the underlying flooring slat 12. Indeed, the bolt elongated head portion 24b is much longer than the anchoring openings 14 are wide, and to extract it from the flooring slats 12, a user must voluntarily and necessarily tilt bolt 24 manually in order to extract its head portion 24b out of the anchorage openings 14.

This relative dimensioning between the anchorage openings 14 and the elongated head portion 24b therefore ensures that accidental loosening of the interconnection between nut 30 and bolt 24 does not lead to the disconnection of the elbowed fastener—and thus of rail 20—from the flooring slats 12, and therefore ensures that a minimal anchoring of the rails to the flooring slats exists as long as the head portion 24b of the elbowed bolt 24 is inserted in the anchorage opening 14 of the slats 12.

A number of modifications could be made to the present invention without departing from the scope of the present invention.

For example, side walls 16a, 16a' of U-shaped beam 16, which serve as abutment means for the head portion of the bolt when an elongated nut is screwed thereon, could be replaced by any other suitable abutment means such as a vertical pin projecting downwardly from the undersurface of flooring slat top wall 12a for example, adjacently to each anchorage opening.

It is also understood that the anchorage openings could be of any suitable shape as long as they have a maximal width (e.g. the diameter of the above-described circular openings 14) substantially inferior to the length of the head portion of the bolt, so as to prevent release of the elbowed fastener from the flooring slats in the event where the nut comes loose from the L-shaped bolt.

Moreover, it is understood that instead of the elongated C-shaped rails 20, any suitable form of alternate cargo restraint members could be used to restrain the cargo items. For example, the cargo restrain members could be rails of any suitable alternate cross-sectional shape (U-shaped, W-shaped, etc.) Alternately, one or more chocks could be used instead of rails to restrain movement of the cargo units about the cargo flooring structure, with each chock fastened to the cargo flooring structure using a single elbowed fastener for example. In further alternate embodiments, strap attachment means could be provided on the cargo restraint members, to allow strapping of the cargo items thereto.

In the above-described embodiment of the invention, the elbowed fastener of the above embodiment comprises a L-shaped bolt having a head portion transversely connected to a threaded shank portion onto which an elongated nut can be screwed. In alternate embodiments, the threaded shank portion of the L-shaped bolt and the elongated nut could be replaced by alternate complementary fastening members capable of mutual engagement and capable of lockingly engaging the cargo restraint member, e.g. the rails, and secure them to the flooring slats. These cooperating fastening members in combination form the main body portion of the elbowed fastener used to secure the rail to the underlying flooring structure.

Moreover, the above-described embodiment shows a flooring structure comprising a number of interlocked tongue-and-groove type slats, each slat having a number of spaced-apart anchorage openings made therethrough. It is understood that the composition of the floor structure could vary as, long as it comprises a number of anchorage openings thereon. For example, it could also be a large, flat metallic panel comprising an array of anchorage openings thereon.

The invention claimed is:

1. A cargo restraint system, comprising:
    a floor structure defining a number of anchorage openings made thereon, each said anchorage opening defining a maximum width:
    at least one elbowed fastener having an elongated head portion defining a length greater than said anchorage opening maximum width and a maximal cross-sectional width smaller than said anchorage opening maximum width, said elbowed fastener also defining a body portion connected transversely to said head portion; wherein said head portion of said elbowed fastener is inserted into one of said anchorage openings of said floor structure and said body portion extends from this said anchorage opening and projects away from said floor structure;
    at least one cargo restraint member for restraining movement of a cargo item about said floor structure;
    wherein said elbowed fastener head portion releasably engages one of said anchorage openings, and said elbowed fastener body portion lockingly engages said cargo restraint member, so as to fasten the latter to said floor structure, said elbowed fastener also comprising an L-shaped bolt defining a bolt threaded shank portion and a bolt elongated head portion connected transversely thereto and corresponding to said elbowed fastener head portion, said elbowed fastener further comprising a nut capable of threadingly engaging said bolt threaded shank portion, said bolt threaded shank portion and said nut in combination forming said elbowed fastener body portion and wherein said cargo restraint member comprises at least one opening for penetration by said bolt threaded shank portion, wherein said nut is screwed onto said threaded shank portion in order for a bottom portion of said nut to be applied against said cargo restraint member for fastening the latter to said floor structure.

2. The cargo restraint system according to claim 1, wherein said nut bottom portion defines a ribbed surface for enabling increased biting action thereof onto said cargo restraint member.

3. The cargo restraint system according to claim 1, wherein said floor structure defines a top wall across which said anchorage openings are made, with bolt abutment means for preventing said bolt from rotating when said nut is screwed onto said bolt threaded shank portion, said bolt abutment means attached to an undersurface of said top wall in the vicinity of said anchorage openings.

4. The cargo restraint system according to claim 3, further comprising at least one elongated beam affixed to said floor structure undersurface, said elongated beam comprising two side walls transverse to said floor structure undersurface and a bottom wall extending transversely to and between said side walls, said side walls forming said bolt abutment means.

5. The cargo restraint system according to claim 1, wherein said cargo restraint member is an elongated rail, and said cargo restraint system comprises at least two of said elbowed fasteners.

6. The cargo restraint system according to claim 5, wherein said elongated rail is cross-sectionally C-shaped, and comprises two elongated side walls each connected at one edge to opposite longitudinal edges of an elongated bottom wall, with openings being made through said rail bottom wall each made for selective engagement by said body portion of a corresponding one of said elbowed fasteners, said side walls carrying at another edge an open top rail surface.

7. The cargo restraint system according to claim 6, wherein the length of said body portion of each of said elbowed fasteners is such that the body portion of each of said elbowed fasteners clears said open top rail surface when it fastens said rail to said floor structure.

8. The cargo restraint system according to claim 6, wherein said elongated rail comprises a number of rail openings made on said rail bottom wall, each for penetration by said body portion of one of said elbowed fasteners.

9. The cargo restraint system according to claim 8, wherein said rail openings are ellipsoid slots, each said ellipsoid slot extending in a direction transverse to said longitudinal rail, for enabling fine-tune displacement of said rail along said transverse direction when at least one of said ellipsoid slots is penetrated by said body portion of one of said elbowed fasteners.

10. The cargo restraint system according to claim 1, wherein said anchorage openings are circular.

11. The cargo restraint system according to claim 1, wherein said floor structure comprises a number of elongated tongue-and-groove type slats fitted close to one another.

12. A cargo restraint system, comprising:
    a floor structure defining a number of anchorage openings made thereon, each said anchorage opening defining a maximum width;
    at least one elbowed fastener, for attaching a cargo restraint member to said floor structure, said elbowed fastener having an elongated head portion defining a length greater than said anchorage opening maximum width and a maximal cross-sectional width smaller than said anchorage opening maximum width, said elbowed fastener also defining a body portion connected transversely to said head portion; wherein said head portion of said elbowed fastener is inserted into one of said anchorage openings of said floor structure and said body portion forms a threaded shank portion, extending from this said anchorage opening and projecting away from said floor structure;
    wherein said elbowed fastener head portion releasably engages one of said anchorage openings, and said elbowed fastener body portion is for lockingly engaging the cargo restraint member to fasten the latter to said floor structure, wherein said elbowed fastener comprises an L-shaped bolt defining a bolt threaded shank portion and a bolt elongated head portion connected transversely thereto and corresponding to said elbowed fastener elongated head portion, said elbowed fastener further comprising a nut capable of threadingly engaging said bolt threaded shank portion, said bolt threaded shank portion and said nut in combination forming said elbowed fastener body portion and wherein said cargo restraint member comprises at least one opening for penetration by said bolt threaded shank portion, and wherein said nut is screwed onto said threaded shank portion in order for a bottom portion of said nut to be applied against said cargo restraint member for fastening the latter to said floor structure.

13. The cargo restraint system according to claim 12, wherein said floor structure defines a top wall across which said anchorage openings are made, with bolt abutment means for preventing said bolt from rotating when said nut is screwed onto said bolt threaded shank portion, said bolt abutment means attached to an undersurface of said top wall in the vicinity of said anchorage openings.

14. The cargo restraint system according to claim 13, further comprising at least one elongated beam affixed to said floor structure undersurface, said elongated beam comprising two side walls transverse to said floor structure undersurface and a bottom wall extending transversely to and between said side walls, said side walls forming said bolt abutment means.

15. The cargo restraint system according to claim 12, wherein said anchorage openings are circular.

16. A cargo restraint system, for use with a floor structure defining a top wall and a number of anchorage openings made though the top wall, each anchorage opening defining a maximum width; said cargo restraint system comprising:

at least two elbowed bolts having an elongated head portion defining a length such as to be greater than the anchorage opening maximum width, and defining a maximal cross-sectional width such as to be smaller than the anchorage opening maximum width, said elbowed bolt also defining a threaded shank portion connected transversely to said head portion; wherein said bolt head portion can be inserted into one of the anchorage openings of the floor structure and said threaded shank portion can extend from this anchorage opening and project away from the floor structure top wall;

a nut capable of threadingly engaging said bolt threaded shank portion;

bolt abutment means for preventing said bolt from rotating when said nut is screwed onto said bolt threaded shank portion to be provided about an undersurface of the floor structure top wall in the vicinity of its anchorage openings;

wherein said bolt head portion is inserted in one of the anchorage openings and said nut is screwed on said bolt threaded shank portion for fastening a cargo restraint member to the floor structure; and wherein said bolt head portion abuts against said bolt abutment means when said nut is screwed onto said threaded shank portion to prevent rotational movement of said bolt.

* * * * *